United States Patent
Bhardwaj et al.

(10) Patent No.: US 9,331,358 B2
(45) Date of Patent: May 3, 2016

(54) BATTERY WITH MULTIPLE JELLY ROLLS IN A SINGLE POUCH

(75) Inventors: Ramesh C. Bhardwaj, Fremont, CA (US); Taisup Hwang, Santa Clara, CA (US); Richard M. Mank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1257 days.

(21) Appl. No.: 12/694,144

(22) Filed: Jan. 26, 2010

(65) Prior Publication Data

US 2011/0183169 A1   Jul. 28, 2011

(51) Int. Cl.
*H01M 10/0587* (2010.01)
*H01M 10/04* (2006.01)

(52) U.S. Cl.
CPC ...... *H01M 10/0431* (2013.01); *H01M 10/0404* (2013.01); *H01M 10/0587* (2013.01); *Y10T 29/4911* (2015.01); *Y10T 29/49108* (2015.01)

(58) Field of Classification Search
CPC .................. H01M 10/0431; H01M 10/0587
See application file for complete search history.

(56) References Cited

U.S. PATENT DOCUMENTS

2007/0059593 A1* 3/2007 Kim et al. ...................... 429/162
2007/0072066 A1* 3/2007 Yoon et al. ...................... 429/99
2008/0299451 A1* 12/2008 Funahashi et al. ............ 429/149

FOREIGN PATENT DOCUMENTS

| KR | 1020030066960 A |   | 8/2003 |
| KR | 2004054201 A | * | 6/2004 |
| KR | 1020040054201 A |   | 6/2004 |
| KR | 1020080019311 A |   | 3/2008 |
| KR | 1020080038465 A |   | 5/2008 |
| WO | WO 2007145441 A1 | * | 12/2007 |

* cited by examiner

*Primary Examiner* — Barbara Gilliam
*Assistant Examiner* — Stephan Essex
(74) *Attorney, Agent, or Firm* — Polsinelli PC (57) ABSTRACT

The disclosed embodiments provide a battery cell which includes a set of jelly rolls enclosed in a pouch. Each jelly roll includes layers which are wound together, including a cathode with an active coating, a separator, and an anode with an active coating. The battery cell also includes a first set of conductive tabs and a second set of conductive tabs. Each of the first set of conductive tabs is coupled to the cathode of one of the jelly rolls, and each of the second set of conductive tabs is coupled to the anode of one of the jelly rolls. At least one of the first set and one of the second set of conductive tabs extend through seals in the pouch to provide terminals for the battery cell.

17 Claims, 6 Drawing Sheets

BATTERY WITH MULTIPLE JELLY ROLLS IN A SINGLE POUCH

BACKGROUND

1. Field

The present embodiments relate to batteries for portable electronic devices. More specifically, the present embodiments relate to battery cells with multiple jelly rolls in a single pouch.

2. Related Art

Rechargeable batteries are presently used to provide power to a wide variety of portable electronic devices, including laptop computers, cell phones, PDAs, digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing a jelly roll and electrolyte in a foil pouch. Multiple pouches may then be placed side-by-side within a portable electronic device and connected in series and/or in parallel to form a battery for the portable electronic device.

Hence, the use of portable electronic devices may be facilitated by improvements related to the packaging efficiency, capacity, form factor, cost, and/or manufacturing of lithium-polymer battery cells.

SUMMARY

The disclosed embodiments provide a battery cell which includes a set of jelly rolls enclosed in a pouch. Each jelly roll includes layers which are wound together, including a cathode with an active coating, a separator, and an anode with an active coating. The battery cell also includes a first set of conductive tabs and a second set of conductive tabs. Each of the first set of conductive tabs is coupled to the cathode of one of the jelly rolls, and each of the second set of conductive tabs is coupled to the anode of one of the jelly rolls. At least one of the first set and one of the second set of conductive tabs extend through seals in the pouch to provide terminals for the battery cell.

In some embodiments, the jelly rolls are electrically connected within the pouch or outside the pouch using the first and second sets of conductive tabs.

In some embodiments, the jelly rolls are electrically connected in a series configuration, in a parallel configuration, or in a series and parallel configuration.

In some embodiments, the jelly rolls are internally separated within the pouch if the jelly rolls are electrically connected in the series configuration.

In some embodiments, the jelly rolls are of different thicknesses.

In some embodiments, the jelly rolls are sealed in the pouch based on an asymmetric battery design.

In some embodiments, sealing the jelly rolls in the pouch involves at least one of gluing the jelly rolls to the inside of the pouch and placing the jelly rolls within a set of frames inside the pouch.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a battery cell containing a set of jelly rolls enclosed in a pouch. Each jelly roll includes layers which are wound together, including a cathode with an active coating, a separator, and an anode with an active coating. The battery cell also includes a first conductive tab coupled to the cathode of one or more of the jelly rolls and a second conductive tab coupled to the anode of one or more of the jelly rolls. The first and second conductive tabs extend through seals in the pouch to provide terminals for the battery cell. The first and second conductive tabs may also be used to electrically connect the jelly rolls within the pouch or outside the pouch, in series and/or in parallel.

The jelly rolls may be of different thicknesses and sealed in the pouch based on an asymmetric battery design. As a result, the battery cell may be designed to accommodate the space constraints of a portable electronic device such as a laptop computer, mobile phone, personal digital assistant (PDA), digital camera, and/or portable media player. For example, jelly rolls of various thicknesses may be stacked, placed side-by-side, and/or placed top-to-bottom within the pouch to fit the battery cell behind the display of a laptop computer. The use of multiple jelly rolls in a single pouch may additionally provide advantages related to battery packaging efficiency, capacity, manufacturing, and/or cost.

Figure 1:
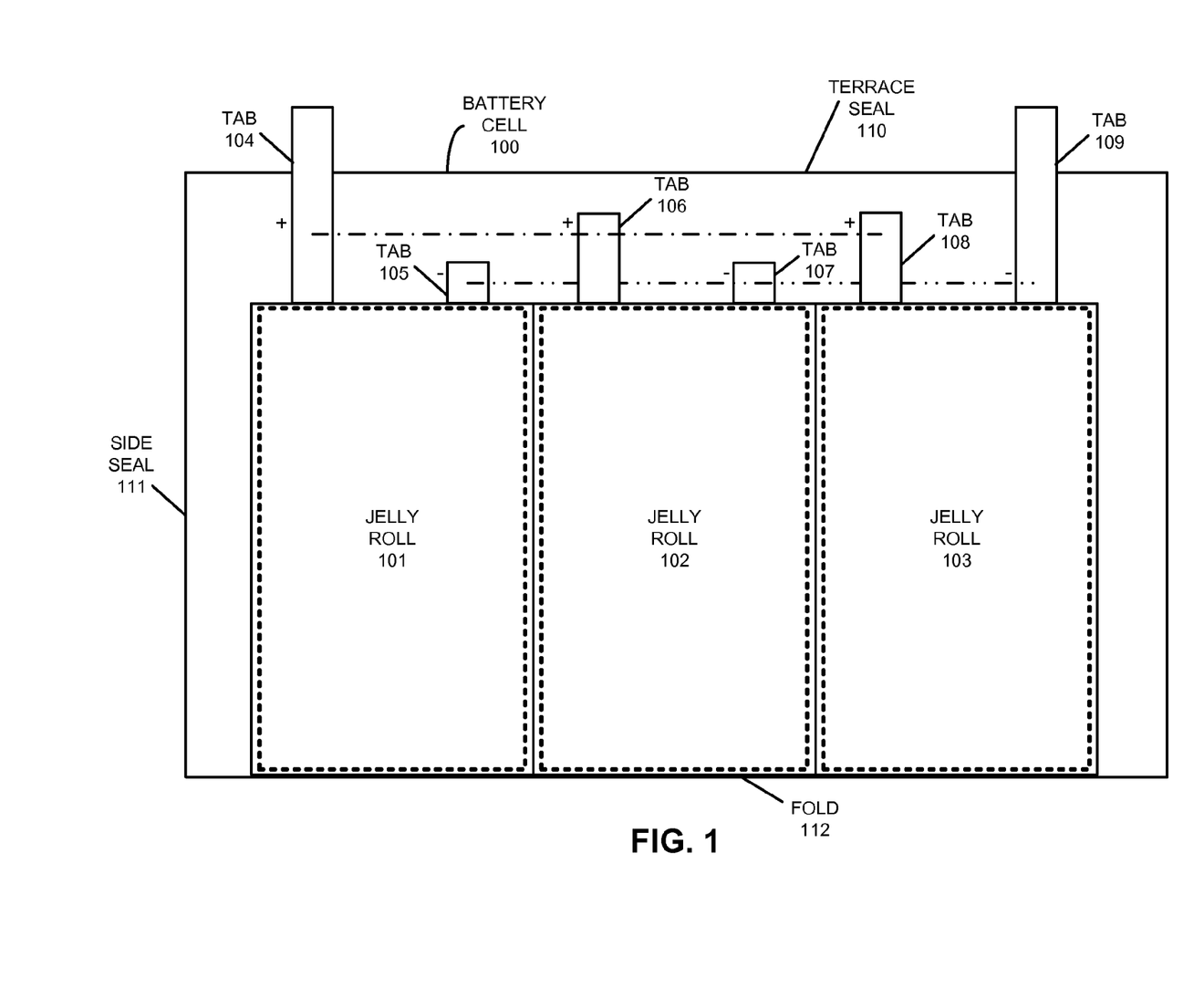
FIG. 1 shows a battery cell in accordance with an embodiment.

FIG. 1 shows a battery cell 100 in accordance with an embodiment. Battery cell 100 includes a set of jelly rolls 101-103 and a set of conductive tabs 104-109. Each jelly roll 101-103 includes a number of layers which are wound together, including a cathode with an active coating, a separator, and an anode with an active coating. Jelly rolls are well known in the art and will not be described further.

In one or more embodiments, jelly rolls 101-103 are enclosed in a flexible pouch, which is formed by folding a flexible sheet along a fold line 112. For example, the flexible sheet can be comprised of aluminum with a polymer film, such as polypropylene. After the flexible sheet is folded, the flexible sheet can be sealed, for example by applying heat along side seal 111 and along a terrace seal 110. Jelly rolls 101-103 may be sealed within the pouch by gluing jelly rolls 101-103 to the inside of the pouch and/or placing jelly rolls 101-103 within a set of frames inside the pouch.

Furthermore, jelly rolls 101-103 may be coupled to conductive tabs 104-109 and to one another through conductive tabs 104-109. In particular, jelly roll 101 is coupled to conductive tabs 104-105, jelly roll 102 is coupled to conductive tabs 106-107, and jelly roll 103 is coupled to conductive tabs 108-109. Conductive tab 104 extends through terrace seal 110 to provide a positive terminal for battery cell 100, and conductive tab 109 extends through terrace seal 110 to provide a negative terminal for battery cell 100.

In one or more embodiments, conductive tabs 104, 106, and 108 are respectively coupled to the cathodes of jelly rolls 101, 102, and 103, while conductive tabs 105, 107, and 109 are respectively coupled to the anodes of jelly rolls 101, 102, and 103. Jelly rolls 101-103 may then be electrically connected in a parallel configuration by coupling conductive tabs 106 and 108 to conductive tab 104 and by coupling conductive tabs 105 and 107 to conductive tab 109 within the pouch. As discussed below with respect to FIG. 2, conductive tabs 104-109 may also be used to connect jelly rolls 101-103 within or outside the pouch in a series configuration or a series-and-parallel configuration.

A battery pack may further be formed by coupling together a number of battery cells (e.g., battery cell 100) in a series, parallel, or series-and-parallel configuration. As a result, complex battery configurations may be achieved by electrically connecting jelly rolls within each battery cell, as well as battery cells within the battery pack, in various series and/or parallel configurations. The coupled cells may be enclosed in a hard case to complete the battery pack, or the coupled cells may be embedded within the enclosure of a portable electronic device, such as a laptop computer, mobile phone, personal digital assistant (PDA), digital camera, and/or portable media player.

Because battery cell 100 contains multiple jelly rolls 101-103 enclosed within a single pouch, battery cell 100 may provide increased packaging efficiency and/or capacity over battery cells that contain only one jelly roll per pouch. For example, if side seal 111 is 4 mm wide, battery cell 100 may provide the same capacity as three battery cells containing one jelly roll each while reducing the width required for the jelly rolls by 16 mm. Conversely, battery cell 100 may provide three times more capacity than a battery cell formed by enclosing only one jelly roll in a pouch.

Figure 2:
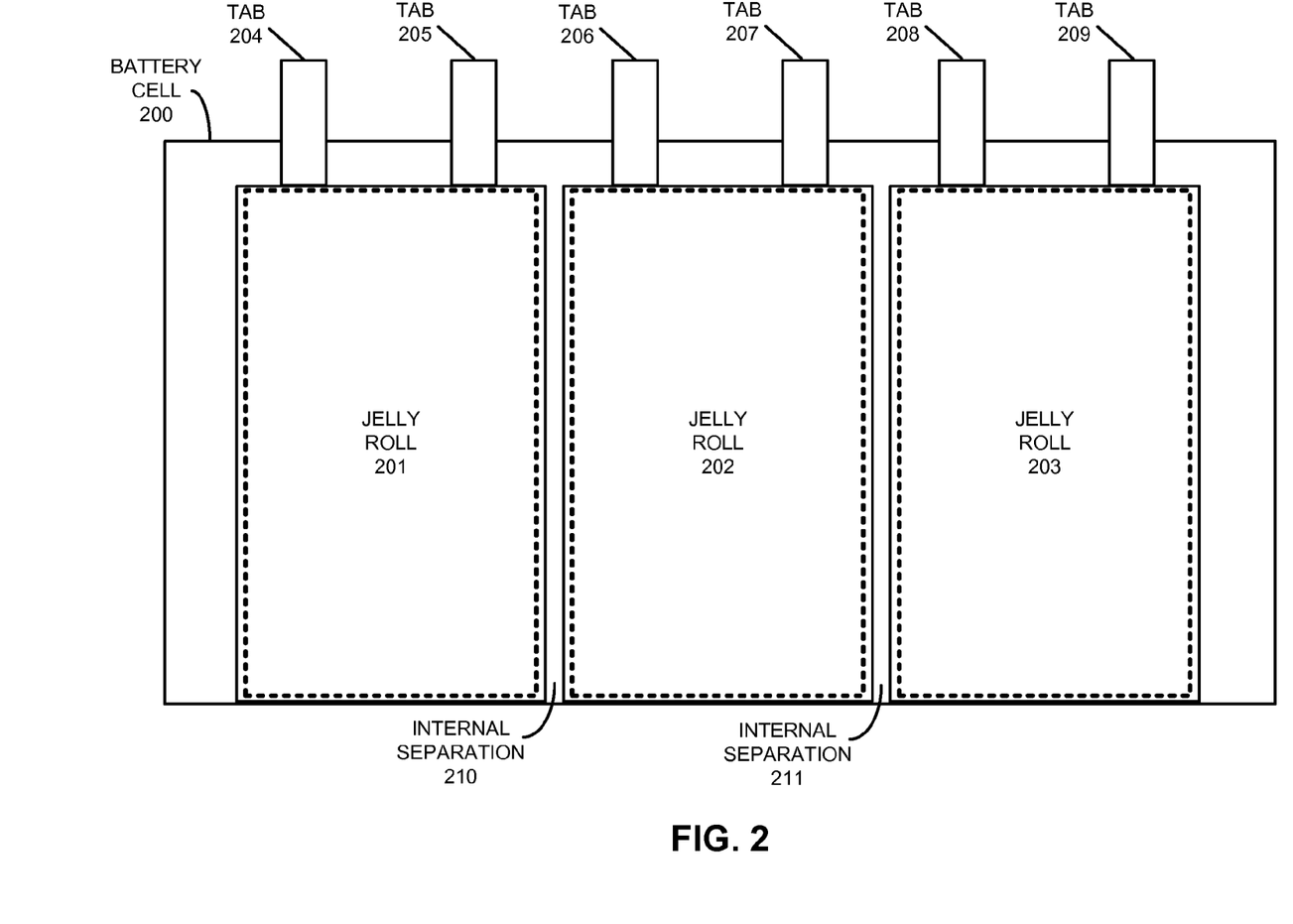
FIG. 2 shows a battery cell in accordance with an embodiment.

FIG. 2 shows a battery cell 200 in accordance with an embodiment. As with battery cell 100 of FIG. 1, battery cell 200 includes a set of jelly rolls 201-203 enclosed within a pouch and a set of conductive tabs 204-209 coupled to jelly rolls 201-203. For example, conductive tabs 204, 206, and 208 may be respectively coupled to the cathodes of jelly rolls 201, 202, and 203, while conductive tabs 205, 207, and 209 may be respectively coupled to the anodes of jelly rolls 201, 202, and 203. However, all conductive tabs 204-209 extend through seals in the pouch, allowing jelly rolls 201-203 to be electrically connected outside the pouch.

In particular, jelly rolls 201-203 may be connected in a series, parallel, or series-and-parallel configuration using conductive tabs 204-209. For example, jelly rolls 201-203 may be connected in a parallel configuration by coupling conductive tabs 204, 206, and 208 to one another and by coupling conductive tabs 205, 207, and 209 to one another. On the other hand, jelly rolls 201-203 may be connected in a series configuration by coupling conductive tab 205 with conductive tab 206, coupling conductive tab 207 with conductive tab 208, and using conductive tabs 204 and 209 as the positive and negative terminals of the battery cell, respectively.

As shown in FIG. 2, the pouch includes two internal separations 210-211 between jelly rolls 201-203. Internal separations 210-211 may be used to create compartments that physically separate jelly rolls 201-203 from one another. Such physical separation may allow series connections between jelly rolls 201-203 to produce voltage increases in the battery cell. Internal separations 210-211 may be created by forming indents and/or ridges in a flexible sheet used to create the pouch. As the sheet is folded and sealed, spot welding may be used to connect the indents and/or ridges. The compartments created using the indents and/or ridges may then be separately filled with one or more jelly rolls and electrolyte.

Figure 3:
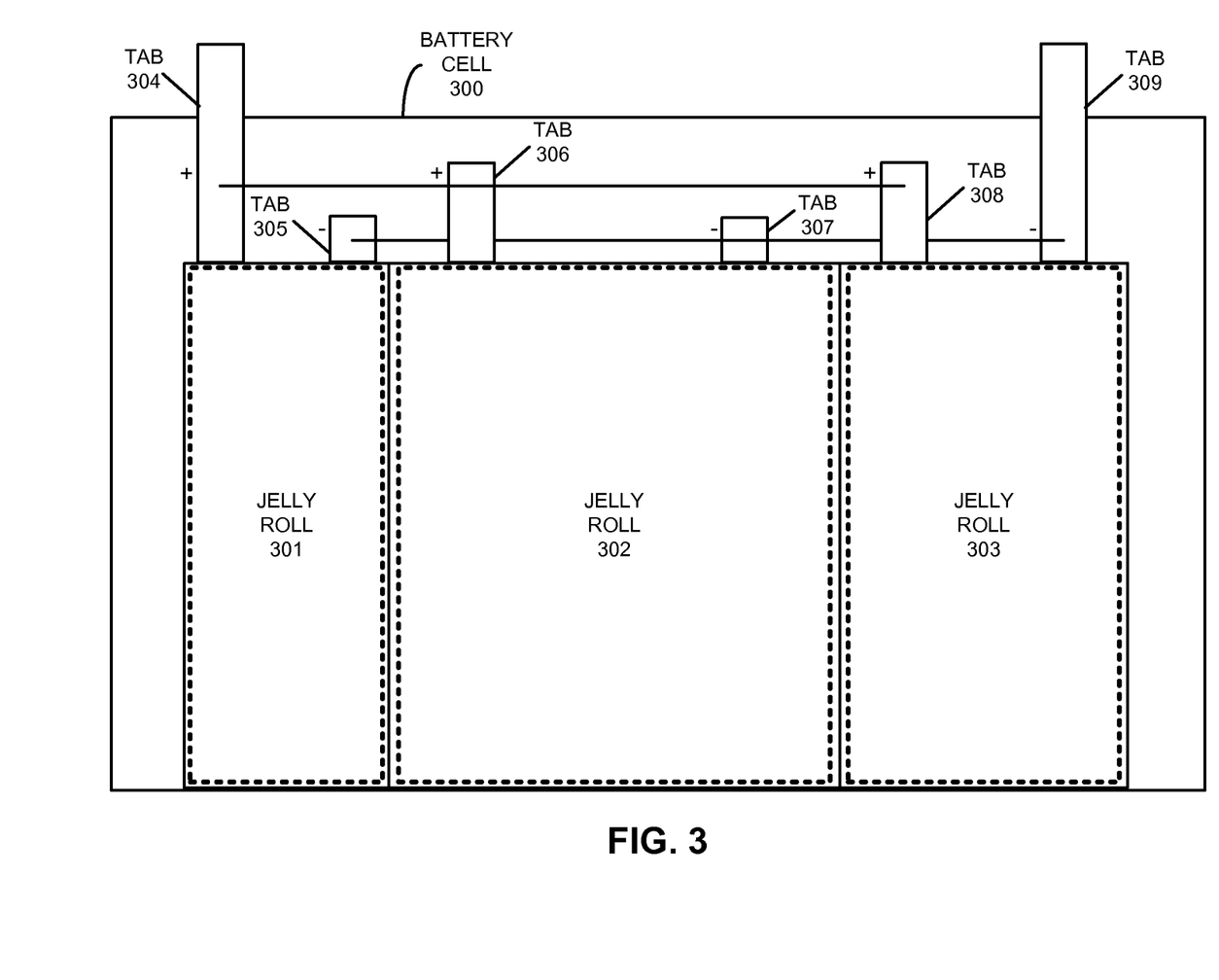
FIG. 3 shows a battery cell in accordance with an embodiment.

FIG. 3 shows a battery cell 300 in accordance with an embodiment. As with FIGS. 1-2, battery cell 300 includes a set of jelly rolls 301-303 enclosed within a pouch, as well as a set of conductive tabs 304-309 coupled to jelly rolls 301-303 and to one another. In particular, conductive tabs 304, 306, and 308 are respectively connected to the cathodes of jelly rolls 301, 302, and 303 and to one another, and conductive tabs 305, 307, and 309 are respectively connected to the anodes of jelly rolls 301, 302, and 303 and to one another. Conductive tab 304 extends through the seal of the pouch to provide a positive terminal for battery cell 300, and conductive tab 309 extends through the seal of the pouch to provide a negative terminal for battery cell 300. Alternatively, as with FIG. 2, conductive tabs 304-309 may all extend through the seal of the pouch to enable electrical connections between jelly rolls 301-303 outside the pouch.

In addition, battery cell 300 contains jelly rolls 301-303 of different thicknesses and/or sizes. As shown in FIG. 3, jelly roll 301 is thinnest, jelly roll 303 is of medium thickness, and jelly roll 302 is the thickest. Furthermore, jelly rolls 301-303 may be placed in the pouch based on an asymmetric battery design that allows battery cell 300 to fill up the free space within a portable electronic device. For example, jelly rolls 301-303 and/or other jelly rolls may be placed side-by-side, placed top-to-bottom, and/or stacked within the pouch to fit battery cell 300 around other components inside a mobile phone, laptop computer, portable media player, digital camera, and/or PDA.

Figure 4:
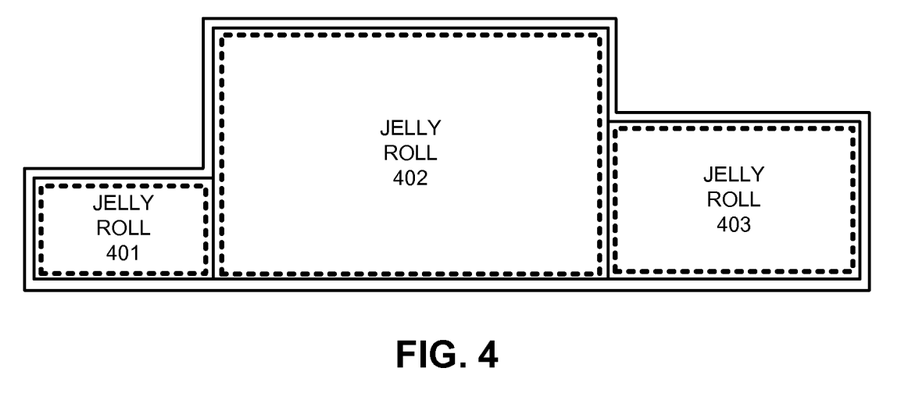
FIG. 4 shows a battery cell in accordance with an embodiment.

FIG. 4 shows a battery cell in accordance with an embodiment. In particular, FIG. 4 shows a side view of battery cell 300 of FIG. 3, with jelly rolls 401-403 corresponding to jelly rolls 301-303. Because jelly roll 402 is thicker than jelly rolls 401 and 403, jelly roll 402 takes up more space in at least two dimensions within the pouch than jelly rolls 401 and 403. Jelly roll 403 takes up the second largest amount of space in at least two dimensions, and jelly roll 401 takes up the least amount of space in at least two dimensions. As discussed below with respect to FIG. 5, jelly rolls within battery cells may also vary in length, thus allowing for asymmetric battery designs that utilize space within portable electronic devices in all three dimensions.

Figure 5:
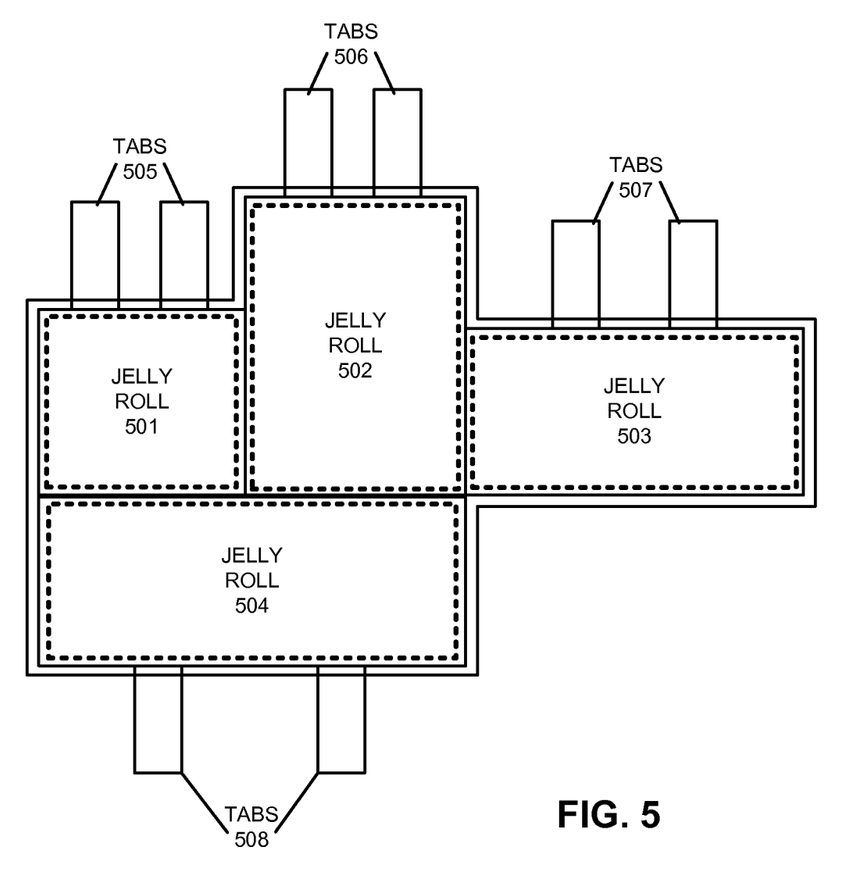
FIG. 5 shows a battery cell in accordance with an embodiment.

FIG. 5 shows a battery cell in accordance with an embodiment. The battery cell includes four jelly rolls 501-504 of different thicknesses and lengths. Jelly rolls 501-503 are placed side-by-side within the pouch, and jelly roll 504 is placed top-to-bottom with jelly rolls 501-502. The battery cell may also include jelly rolls that are stacked on top of each other. For example, additional jelly rolls may be stacked on top of jelly rolls 501-504 to increase the thickness of the pouch in one or more dimensions.

The battery cell additionally includes pairs of conductive tabs 505-508 coupled to jelly rolls 501-504 and extended through seals in the pouch. Within each pair of conductive tabs, one conductive tab is coupled to the cathode of a jelly roll, and the other conductive tab is coupled to the anode of the same jelly roll. Jelly rolls 501-504 may then be electrically connected in series and/or in parallel by coupling conductive tabs 505-508 in various configurations outside the pouch. As described above, jelly rolls 501-504 may include internal separations within the pouch if series connections between jelly rolls 501-504 are to be made.

As a result, the use and placement of multiple jelly rolls of different lengths and thicknesses within a pouch may allow the creation of a custom battery cell that maximizes the use of free space within a portable electronic device and provides greater capacity, packaging efficiency, and/or voltage than battery cells that contain only one jelly roll per pouch. For example, multiple thin jelly rolls may be placed side-by-side and/or top-to-bottom within a pouch to create a battery cell that fits behind the display of a laptop computer and provides power to the laptop computer. Along the same lines, jelly rolls of various thicknesses and lengths may be sealed in a pouch to create an asymmetric battery cell that fits around other components (e.g., processors, printed circuit boards (PCBs), memory, storage, etc.) inside the enclosure of a mobile phone.

Figure 6:
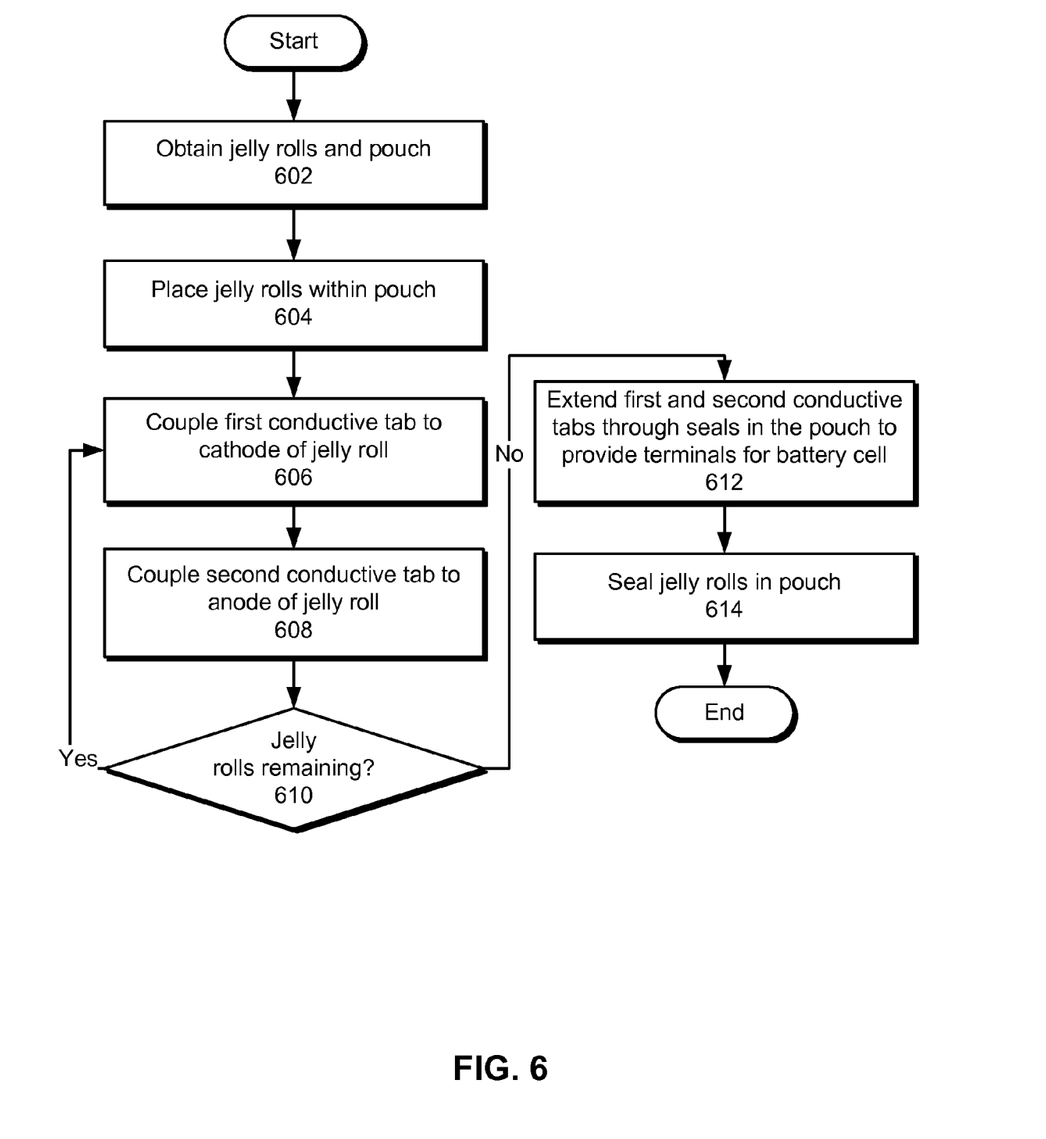
FIG. 6 shows a flowchart illustrating the process of manufacturing a battery cell in accordance with an embodiment.

FIG. 6 shows a flowchart illustrating the process of manufacturing a battery cell in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

Initially, a set of jelly rolls and a pouch to accommodate the jelly rolls are obtained (operation 602). The jelly rolls may be of varying thicknesses and/or lengths. Next, the jelly rolls are placed within the pouch (operation 604). For example, the jelly rolls may be placed side-by-side, top-to-bottom, and/or stacked within the pouch. The jelly rolls may be glued to the inside of the pouch and/or placed within a set of frames inside the pouch.

For each jelly roll, a first conductive tab is coupled to the cathode of the jelly roll (operation 606), and a second conductive tab is coupled to the anode of the jelly roll (operation 608). If additional jelly rolls require coupling to conductive tabs (operation 610), operations 606-608 are performed for all remaining jelly rolls in the pouch. After all jelly rolls are coupled to conductive tabs, at least one pair of conductive tabs is extended through seals in the pouch to provide terminals for the battery cell (operation 612). For example, only one pair of conductive tabs may be extended through seals in the pouch if electrical connections between the jelly rolls are made within the pouch. On the other hand, multiple pairs of conductive tabs may be extended through seals in the pouch if electrical connections between the jelly rolls are to be made outside the pouch.

Finally, the jelly rolls are sealed in the pouch (operation 614). For example, the jelly rolls may be sealed by spot welding and/or applying heat to the seals. Internal separations between the jelly rolls may also be formed during sealing of the jelly rolls in the pouch. As discussed above, the internal separations may allow voltage increases in the battery cell if the jelly rolls are connected in series.

Figure 7:
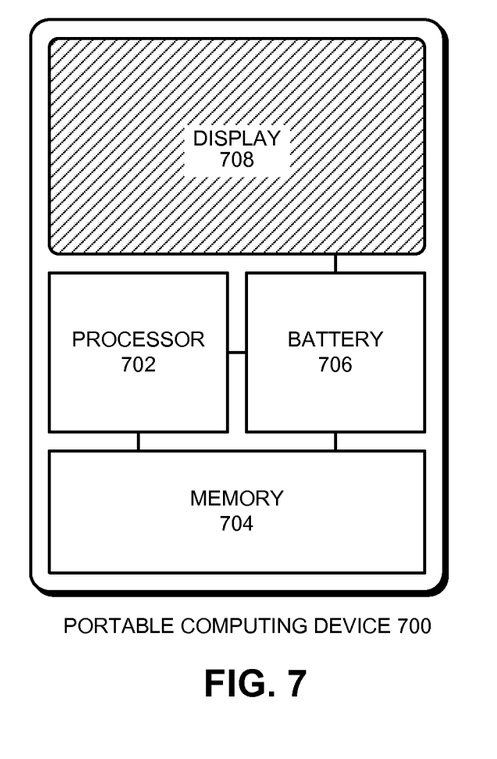
FIG. 7 shows a portable electronic device in accordance with an embodiment.

The above-described rechargeable battery cell can generally be used in any type of electronic device. For example, FIG. 7 illustrates a portable electronic device 700 which includes a processor 702, a memory 704 and a display 708, which are all powered by a battery 706. Portable electronic device 700 may correspond to a laptop computer, mobile phone, PDA, portable media player, digital camera, and/or other type of battery-powered electronic device. Battery 706 may correspond to a battery pack that includes one or more battery cells. Each battery cell includes a set of jelly rolls connected in series and/or in parallel.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
   a set of jelly rolls arranged in a side-by-side configuration, wherein each of the jelly rolls comprises layers which are wound together, including a cathode with an active coating, a separator, and an anode with an active coating;
   a pouch enclosing the set of jelly rolls, wherein the pouch is flexible;
   a first set of conductive tabs, wherein each of the first set of conductive tabs is coupled to the cathode of one of the jelly rolls; and
   a second set of conductive tabs, wherein each of the second set of conductive tabs is coupled to the anode of one of the jelly rolls,
   wherein, for each jelly roll, both the conductive tab coupled to the anode and the conductive tab coupled to the cathode extend from a first side of the jelly roll towards a first side of the pouch; and
   wherein only one tab of the first set and one tab of the second set of conductive tabs extend through seals on the first side of the pouch and the rest of the first and second sets of conductive tabs do not extend through seals on any side of the pouch.

2. The battery cell of claim 1, wherein the jelly rolls are electrically connected outside the pouch using the first and second sets of conductive tabs.

3. The battery cell of claim 2, wherein the jelly rolls are electrically connected:
   in a series configuration:
   in a parallel configuration; or
   in a series and parallel configuration.

4. The battery cell of claim 3, wherein the jelly rolls are internally separated within the pouch if the jelly rolls are electrically connected in the series configuration.

5. The battery cell of claim 1, wherein the jelly rolls are sealed in the pouch based on an asymmetric battery design.

6. The battery cell of claim 1, wherein sealing the jelly rolls in the pouch involves at least one of:
   gluing the jelly rolls to the inside of the pouch; and
   placing the jelly rolls within a set of frames inside the pouch.

7. A battery pack comprising one or more battery cells coupled together and enclosed in a hard case, wherein each of the one or more battery cells includes:
   a set of jelly rolls arranged in a side-by-side configuration, wherein each of the jelly rolls comprises layers which are wound together, including a cathode with an active coating, a separator, and an anode with an active coating;
   a pouch enclosing the jelly rolls, wherein the pouch is flexible;
   a first set of conductive tabs, wherein each of the first set of conductive tabs is coupled to the cathode of one of the jelly rolls; and
   a second set of conductive tabs, wherein each of the second set of conductive tabs is coupled to the anode of one of the jelly rolls,
   wherein, for each jelly roll, both the conductive tab coupled to the anode and the conductive tab coupled to the cathode extend from a first side of the jelly roll towards a first side of the pouch; and
   wherein only one tab of the first set and one tab of the second set of conductive tabs extend through seals on the first side of the pouch and the rest of the first and second sets of conductive tabs do not extend through seals on any side of the pouch.

8. The battery pack of claim 7, wherein the jelly rolls are electrically connected outside the pouch using the first and second sets of conductive tabs.

9. The battery pack of claim 8, wherein the jelly rolls are electrically connected:
   in a series configuration:
   in a parallel configuration; or
   in a series and parallel configuration.

10. The battery pack of claim 9, wherein the jelly rolls are internally separated within the pouch if the jelly rolls are electrically connected in the series configuration.

11. The battery pack of claim 7, wherein sealing the jelly rolls in the pouch involves at least one of:
    gluing the jelly rolls to the inside of the pouch; and
    placing the jelly rolls within a set of frames inside the pouch.

12. A portable electronic device, comprising:
    a set of components powered by a battery pack; and
    the battery pack comprising one or more battery cells coupled together, wherein each of the one or more battery cells includes:
    a set of jelly rolls arranged in a side-by-side configuration, wherein each of the jelly rolls comprises layers which are wound together, including a cathode with an active coating, a separator, and an anode with an active coating;
    a pouch enclosing the jelly rolls, wherein the pouch is flexible;
    a first set of conductive tabs, wherein each of the first set of conductive tabs is coupled to the cathode of one of the jelly rolls; and
    a second set of conductive tabs, wherein each of the second set of conductive tabs is coupled to the anode of one of the jelly rolls,
    wherein, for each jelly roll, both the conductive tab coupled to the anode and the conductive tab coupled to the cathode extend from a first side of the jelly roll towards a first side of the pouch; and
    wherein only one tab of the first set and one tab of the second set of conductive tabs extend through seals on the first side of the pouch and the rest of the first and second sets of conductive tabs do not extend through seals on any side of the pouch.

13. The portable electronic device of claim 12, wherein sealing the jelly rolls in the pouch involves at least one of:
    gluing the jelly rolls to the inside of the pouch; and
    placing the jelly rolls within a set of frames inside the pouch.

14. The portable electronic device of claim 12, wherein the jelly rolls are electrically connected:
    in a series configuration:
    in a parallel configuration; or
    in a series and parallel configuration.

15. The portable electronic device of claim 12, wherein the battery pack is placed behind a display of the portable electronic device.

16. The battery cell of claim 1, wherein, within the pouch, one or more of the jelly rolls in the set of jelly rolls is stacked on one or more other jelly rolls in the set of jelly rolls.

17. A battery pack comprising one or more battery cells coupled together and enclosed in a hard case, wherein each of the one or more battery cells includes:
    a set of jelly rolls arranged in a side-by-side configuration, wherein each of the jelly rolls comprises layers which are wound together, including a cathode with an active coating, a separator, and an anode with an active coating;
    a pouch enclosing the jelly rolls, wherein the pouch is flexible;
    a first set of conductive tabs, wherein each of the first set of conductive tabs is coupled to the cathode of one of the jelly rolls; and
    a second set of conductive tabs, wherein each of the second set of conductive tabs is coupled to the anode of one of the jelly rolls;
    wherein:
    for each jelly roll, a first side of the jelly roll is flush with the same sides of the other jelly rolls in the set of jelly rolls and both the conductive tab coupled to the anode and the conductive tab coupled to the cathode extend from the first side of the jelly roll towards a first side of the pouch;
    wherein only one tab of the first set and one tab of the second set of conductive tabs extend through seals on the first side of the pouch and the rest of the first and second sets of conductive tabs do not extend through seals on any side of the pouch, wherein the only one of the first set and one of the second set of conductive tabs are coupled to different jelly rolls;
    the jelly rolls are electrically connected in a series configuration; and the jelly rolls each fill a separate compartment within the pouch, wherein each separate compartment within the pouch comprises a pouch indent that is connected by spot welding.

* * * * *